(12) United States Patent
Lee et al.

(10) Patent No.: US 7,435,508 B2
(45) Date of Patent: Oct. 14, 2008

(54) MULTIPLE BATTERY ASSEMBLY FOR PORTABLE DEVICES

(75) Inventors: Roland Lee, Flushing, NY (US); Quintin Morris, Reading (GB); Terry Lee, Nan-Tou (TW); Osman Yin, Taichung (TW)

(73) Assignee: Symbol Technologies, Inc., Holtsville, NY (US)

( * ) Notice: Subject to any disclaimer, the term of this patent is extended or adjusted under 35 U.S.C. 154(b) by 783 days.

(21) Appl. No.: 10/954,437

(22) Filed: Sep. 30, 2004

(65) Prior Publication Data
US 2006/0068274 A1    Mar. 30, 2006

(51) Int. Cl.
*H01M 2/10* (2006.01)
*G06K 7/10* (2006.01)
(52) U.S. Cl. .................... 429/100; 429/9; 235/462.45
(58) Field of Classification Search .............. None
See application file for complete search history.

(56) References Cited

U.S. PATENT DOCUMENTS

| 2002/0150815 | A1 | 10/2002 | Ehara | |
|---|---|---|---|---|
| 2003/0141370 | A1* | 7/2003 | Hamilton et al. | ....... 235/462.45 |
| 2004/0157116 | A1 | 8/2004 | Perkins et al. | |
| 2005/0026035 | A1* | 2/2005 | Ishikawa et al. | ............ 429/100 |

\* cited by examiner

*Primary Examiner*—John S Maples
(74) *Attorney, Agent, or Firm*—Fay Kaplun & Marcin, LLP (57) ABSTRACT

Described is a portable electronic device which may include a body accommodating electrical components of the device. The body defines a battery chamber and a battery receiving element movably mounted within the battery chamber. The battery receiving element includes a first set of contacts configured for a first battery type and a second contact configured for a second battery type and is movable between a first position in which the first set of contacts is exposed in the battery chamber and a second position in which the second contact is exposed in the battery chamber.

18 Claims, 6 Drawing Sheets

MULTIPLE BATTERY ASSEMBLY FOR PORTABLE DEVICES

FIELD OF THE INVENTION

The present invention relates to portable electronic devices, and in particular to battery assembly used in portable electronic devices.

BACKGROUND INFORMATION

Portable computing devices have become an integral part of modern life, both as related to business activities and also for recreational purposes. In many cases, these devices combine multiple functions, such as computing, storing addresses, storing data, processing electronic mail and messages, and executing applications. Increasingly, more specialized functions are also carried out by these portable devices, such as scanning bar codes of products and merchandise. Such more specialized functions are useful to consumers, as well as to sellers and manufacturers to keep track of inventories, products, etc.

Many portable devices also are capable of wireless connection to a computer network, such as the Internet, a local network, a corporate network and others. As a result, these portable units do not require any wired connections to carry out their functions. Batteries are commonly used to power the portable electronic devices described herein, since they provide complete freedom of movement to the users of these wireless electronic tools. Alternatively, power adapters may be used to power the devices using electrical sockets. However, this approach requires tethering the portable electronic tools to a stationary power supply with cords, which reduces the portability and usefulness of the devices.

Many of the multi-purpose portable electronic devices in use today can be powered by a variety of batteries, or of combinations of batteries. However, the practical selection of batteries which may be used has been limited by the shape and size of the device's battery compartment, and by the size and configuration of the electric terminals used to connect the batteries to the electronic components of the device. In many cases, it has not been practical to design a battery compartment which can accommodate more than one type of battery. In other cases, separate battery adapters have been provided, but these are clumsy to use and often become misplaced because they are not firmly connected to the device.

SUMMARY OF THE INVENTION

The present invention relates to a battery receiving assembly of a portable device. The assembly may include a first set of contacts configured for a first battery type and a second contact configured for a second battery type. The assembly is movably mounted within a battery chamber of the device and is movable between a first position in which the first set of contacts is exposed in the battery chamber and a second position in which the second contact is exposed in the battery chamber.

The present invention also relates to a portable electronic device, which includes a body accommodating electrical components of the device. The body defines a battery chamber and a battery receiving element movably mounted within the battery chamber. The battery receiving element includes a first set of contacts configured for a first battery type and a second contact configured for a second battery type and is movable between a first position in which the first set of contacts is exposed in the battery chamber and a second position in which the second contact is exposed in the battery chamber.

DETAILED DESCRIPTION

The present invention may be further understood with reference to the following description and the appended drawings, wherein like elements are referred to with the same reference numerals. Modern developments in the miniaturization of electronics have brought to the market a wide range of portable, pocket sized devices that can perform many functions. These electronic devices combine multiple functions to provide the user with great flexibility in how to use them. For example, portable electronic computers have been incorporated with additional functionalities, such as the ability to connect without wires to a computer network. Access to the Internet, to local networks, to private networks and to a variety of other sources of data can be thus achieved without tying the device to data cables.

These portable devices have found extensive use as consumer electronics, used for example for shopping assistance, and as work tools, used in the field to perform business functions. Devices used in work environments, in particular, have been developed to incorporate specialized functions. For example, scanners such as barcode scanners may be incorporated with a portable electronic processor, which provides the ability to manipulate data on the spot, and to connect with a remote database. One such devices is the MC 1000 terminal manufactured by Symbol Technologies of Holtsville, N.Y. This terminal combines several electrical operative components such as a laser scanner capable of reading two and three dimensional barcode indicia with a data entry device (for example a keyboard) and an electronic processor, in a single portable device. The processor may be optimized to analyze the data read by the scanner, correlate it with existing databases, and/or control communication functions of the device.

One of the advantages of devices as those described above, is that they are portable, and can perform their functions without wired connections to other devices or systems. To transmit and receive data, the portable devices are able to connect to wireless public networks, such as through "hot spots", and to private or dedicated networks, for example those operated by a company or business. To retain the portability of the devices, power is typically provided by batteries, thus dispensing with the need to use wires connected to a stationary power source. The portable device may obtain even more flexibility by permitting the user to utilize a wide variety of batteries to power the device. The more different battery types may be used to power the device, the more likely that some acceptable combination of batteries will be available at any given time and location.

In theory, the portable device may be alimented with any combination of battery or batteries which provides the voltage and current required to power the device. However, in practice, the selection of acceptable batteries is further limited by the shape of the battery compartment of the device, and by the configuration of the battery contacts which may be used to connect to the terminals of the batteries. In some cases, adapters have been provided with certain portable devices, which modify the battery compartment to receive different types of battery. However, these adapters typically are not secured to the portable device, and can easily be lost, and may not be available when it is necessary to reconfigure the battery compartment to receive a different battery type.

The embodiments of the present invention provide the user of a portable electronic device with the ability to employ various different battery types and configurations to power the device. For example, cylindrical shape batteries may be used to power the electronic device, such as standard, off the shelf AA, AAA, D or C cell batteries. In addition, prismatic shape batteries may also be used, such as rechargeable batteries, Li-ion batteries etc., without having to attach a separate component to the electronic device. The embodiments according to the present invention provide for a portion of the battery compartment which can be moved by the user to present battery contacts adapted for the various types of batteries being used. Movable spacer elements are also provided, which configure the shape of the battery compartment to receive those types of batteries. The movable components are a unitary part of the portable electronic device, so that the user does not need to be concerned with losing the adapter, or utilizing it incorrectly.

An exemplary embodiment of a portable device, according to the present invention, which is able to utilize different types of batteries is shown in FIGS. 1, 3, 5 and 7. The portable device 100 may be, for example, a hand held barcode scanner which incorporates an electronic processor and which may also incorporate devices to provide a wireless connection to a computer network. The device 100 comprises a body 104 which forms a shell containing the various components of the scanner. A laser scanning window 106 may be provided at one end of the device 100, so that barcode of merchandise, equipment and other targets may be scanned by the user. The body 104 may have top surface 108 (not visible in the drawing) which includes, for example, a data entry device and a data display device. The data entry device may comprise a keyboard, a touch pad, or any other conventional component. The data display device may comprise a screen or another similar component. A connection 109 may be provided, to connect a data or power cable to the device 100.

The scanning unit of the device 100 may be included within the housing 104, and may be of a size and shape appropriate to minimize the overall dimensions of the device. The scanning unit may include a reader (e.g., optical scanning element) that is designed to read the merchandise identification codes through window 106. Although the present description is directed to an optical device used to read bar codes, the reader may employ different technologies to collect other types of identification codes or indicia. In one example, the reader includes a light source which emits a light beam, laser beam, or other type of optical energy, for example using a diode. The light beam is reflected by the bar code found on the tag being scanned, and the reflected light is collected by an optical receiver. An electronic processor may be configured to control the operation of the reader, by monitoring light emission and sensing. In addition, the processor may control operation of a memory of the device 100, by storing therein the product codes obtained by the reader. The memory may be any type of electronic memory, such as a memory chip, optical storage device, or magnetic media.

The body 104 defines a battery compartment 102 (e.g., battery chamber), which has dimensions sufficient to contain the batteries used to power the hand held scanner. At one end of the battery compartment 102, there is an adapter plate 110 (e.g., battery receiving element) which contains battery contacts adaptable to different configurations of batteries, as will be described in greater detail below. The shape and dimensions of the battery compartment 102 are sufficient so that the largest battery or combination of batteries which can be used to power the device 100 can fit therein. However, since the device 100 is portable, the size of the battery compartment 102 should not be greater than necessary, since that would needlessly increase the overall dimensions of the portable device 100.

Figure 9:
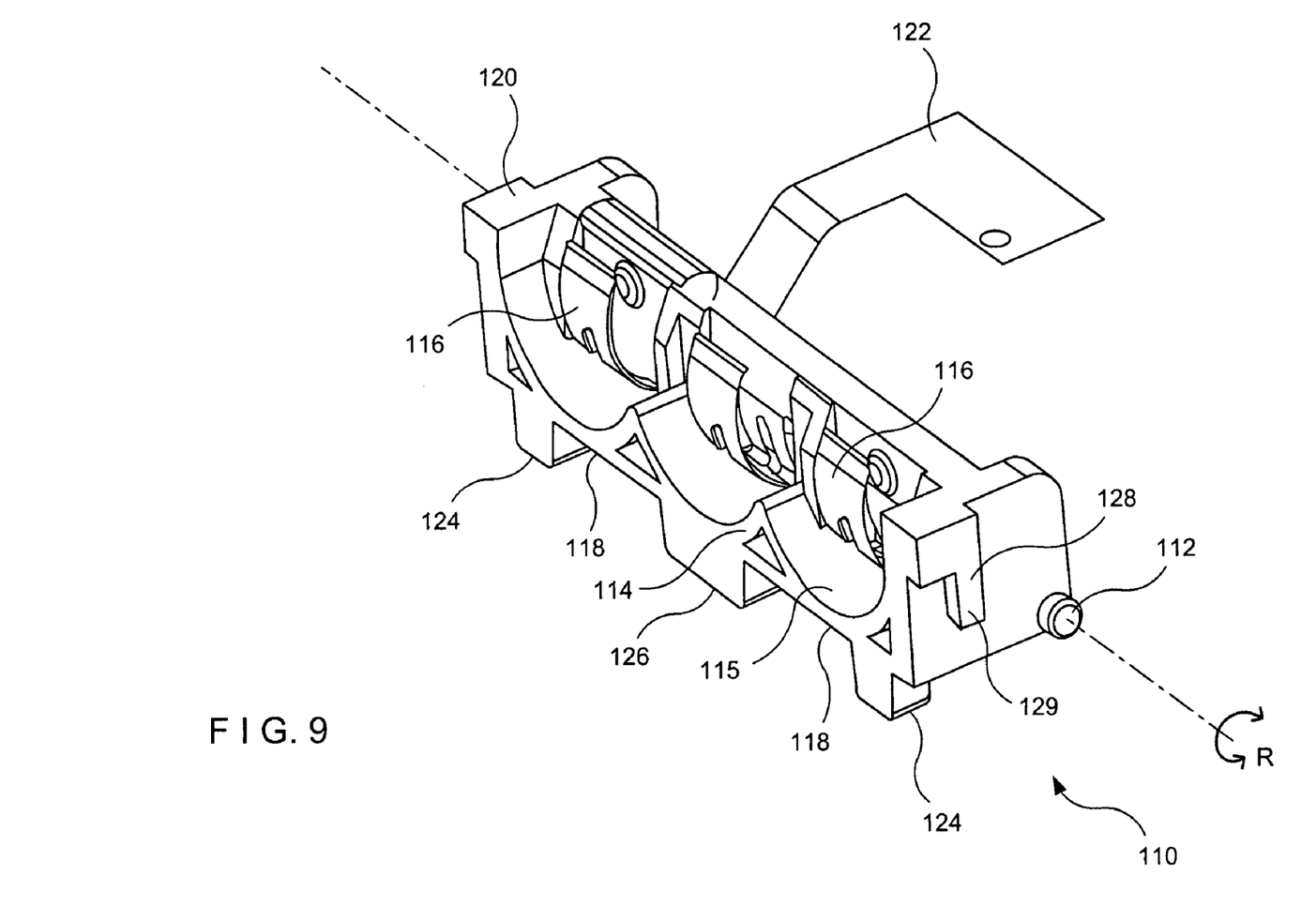
FIG. 9 is a perspective wire drawing showing an exemplary embodiment of a contacts adapter plate according to the invention.

FIG. 9 shows in greater detail the adapter plate 110, which forms an unitary assembly with the battery compartment 102, after the portable device 100 has been assembled in the configuration given to the user. The exemplary adapter plate 110 is optimized to allow the user to select two types of batteries to power the portable device 100. In one configuration in which the adapter plate 110 is raised, the adapter plate 110 accepts a single prismatic shape battery, such as a Li ion battery. In a second configuration in which the adapter plate 110 is lowered, the adapter plate 110 accepts three cylindrical shape batteries, such as the standard AA or AAA batteries. These may be rechargeable or disposable, depending on the application.

In the two configurations available with the exemplary adapter plate 110, battery contacts are provided at the correct locations to match the positive and negative terminals of the batteries. At the same time, movable spacers are provided to selectively limit the size of the battery compartment 102, so that the chosen type of battery is retained in place without becoming loose or displaced within the battery compartment 102. In the exemplary embodiment of the adapter plate 110 shown, changing from one configuration to the other is accomplished by rotating the adapter plate 110 within the battery compartment 102. For example, a plate body 120 may be provided with pivot points 112 (e.g., pivots) which fit in corresponding slots in the device body 104, and which define an axis of rotation R. The user may manually move the adapter plate 110 from one configuration to the other by rotating it about the axis R (e.g., from a first position to a second position), to fit the desired type of batteries.

The plate body 120 may be formed of a polymer or of a metal, and is sufficiently resilient to resist deformation while being rotated. In the first operative configuration, the adapter plate 110 is adapted to receive cylindrical shape batteries. One face of the plate body 120 incorporates elements adapted to cooperate with a first type of battery, for example three AA cylindrical shape batteries. A spacer element 114 may be used to retain the ends of the batteries in place, for example by forming three concave cradles 115, one for each cylindrical shape battery. The spacer element 114 also retains the ends of the batteries in place, preventing them from rolling within the battery compartment 102. A battery contact 116 is also provided, corresponding to each of the cylindrical shape batteries. Depending on the connection being desired, all or some of the battery contacts 116 are operatively connected to a terminal 122, which in turn may be connected to the electrical supply system of the electronic components provided within the portable device 100.

Figure 5:
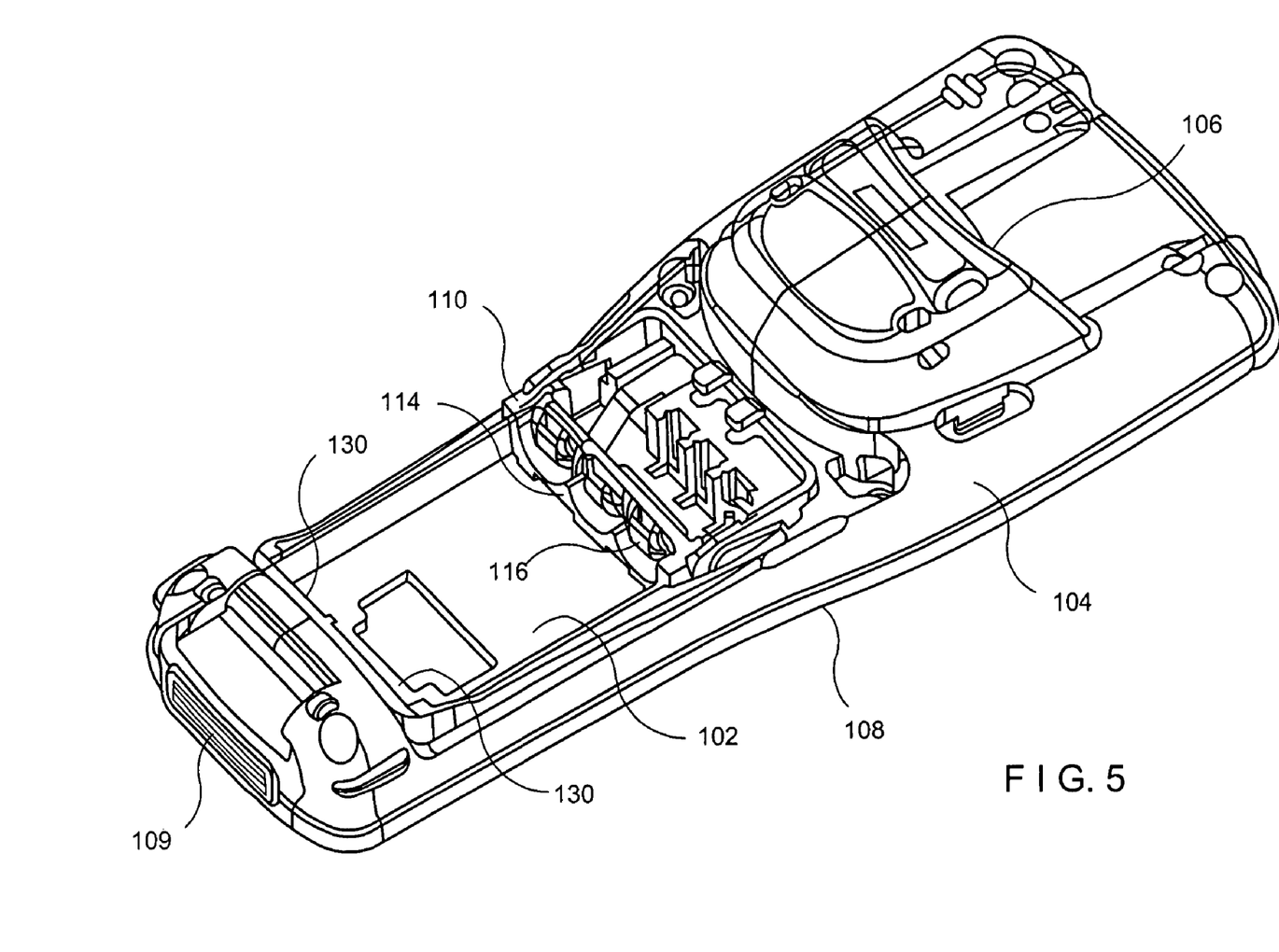
FIG. 5 is a perspective wire drawing showing the exemplary portable device with the contacts adapter plate in a second configuration.
Figure 6:
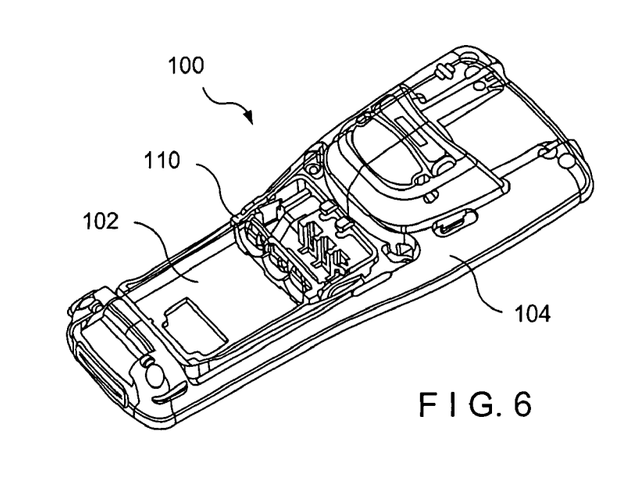
FIG. 6 is a perspective view of the portable device shown in FIG. 5.

The exact form of the connection between the battery contacts 116 and the terminal 122 depends on the electrical configuration of the power supply. For example, if the three cylindrical shape batteries are in parallel, all three of the battery contacts 116 are connected to the terminal 122. As shown in FIG. 5, opposite battery contacts 130 are provided to close the circuit by connecting battery terminals of the same polarity, since the batteries 132 are all in the same orientation. Alternatively, in the more common connection of the batteries in series, batteries 132 are placed in the battery compartment 102 in a staggered orientation, and the battery contacts 116 are connected to each other and to the terminal 122 to form a serial circuit. Opposite battery contacts 130 are then used to complete the circuit by connecting pairs of battery terminals of alternating polarities.

Figure 7:
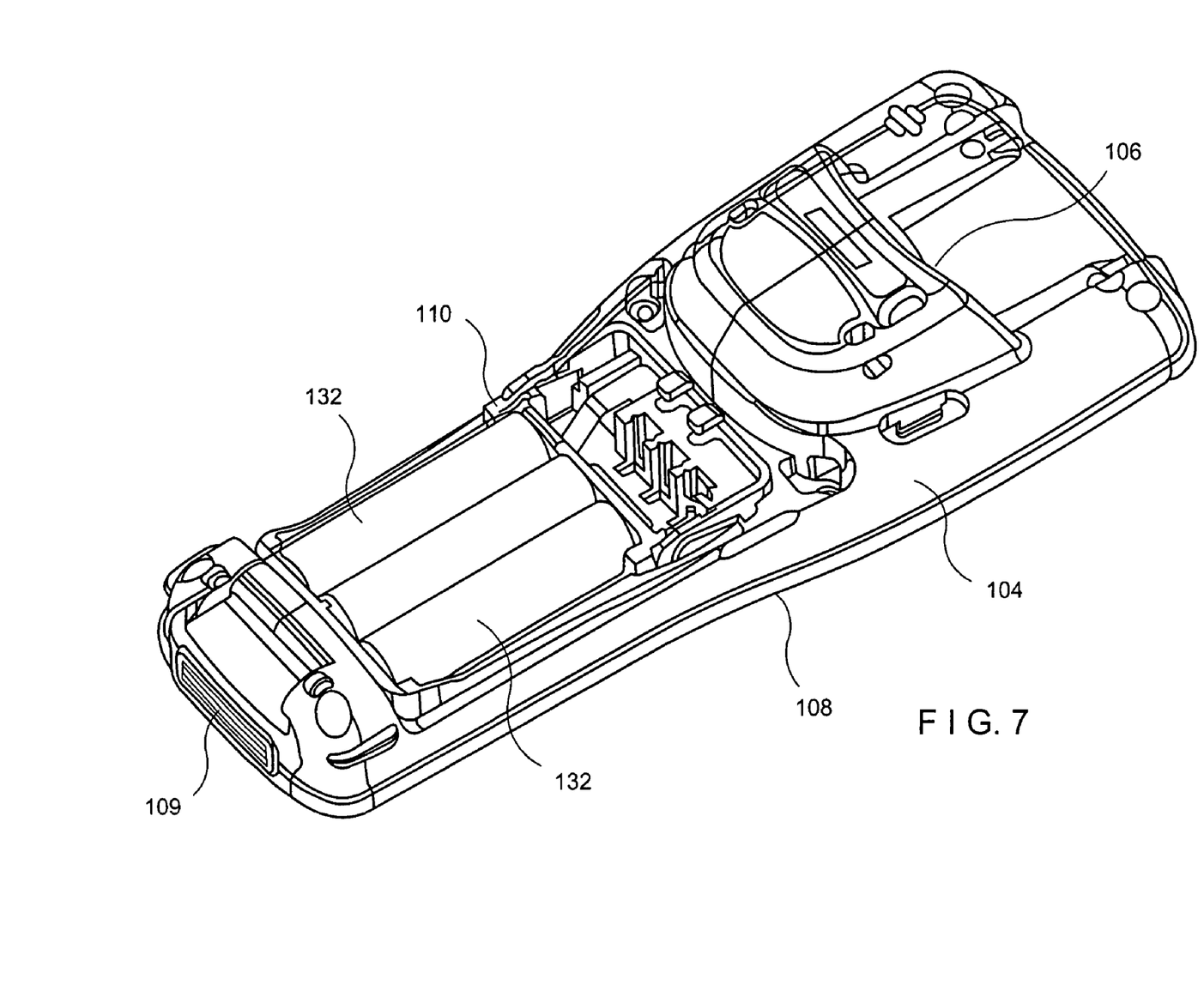
FIG. 7 is a perspective wire drawing showing the exemplary portable device with the contacts adapter plate in the second configuration and containing cylindrical shape batteries.
Figure 8:
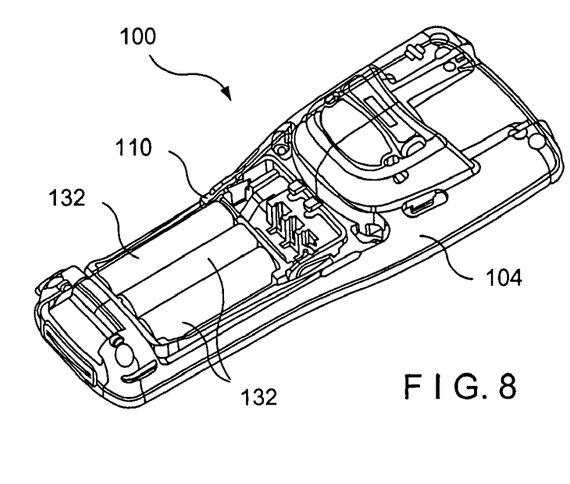
FIG. 8 is a perspective view of the portable device shown in FIG. 7.

An embodiment of the present invention having three cylindrical shape batteries 132 is shown in FIGS. 7 and 8. Here, the adapter plate 110 is turned to the lowered configuration compatible with the three cylindrical shape batteries 132, so that the three battery contacts 116 are electrically connected to each of the batteries 132 to power the electronic device 100. Spacer elements 114, 115 are positioned to retain the cylindrical shape batteries 132 in place, within the battery compartment 102. A battery compartment cover may be placed over the cylindrical shape batteries 132 to secure them in place, and the portable device 100 may be placed in service by the user.

In addition to powering the present exemplary electronic device 100 with cylindrical shape batteries, the present invention makes it possible for the user to power it with a prismatic shape battery, such a s a Lithium Ion battery. The user is given the option of rotating the adapter plate 110 about the R axis to the raised position, and expose battery contacts and spacers appropriate for a prismatic shape battery. For example, the adapter plate 110 may be rotated by hand by the user into this second operative configuration using tabs or shaped portions of the adapter plate 110 for leverage. Side spacers 128 and/or center spacer 126, for example, form protrusions which may be used to facilitate manually grasping and rotating the part. In addition, protrusions 129 or similar elements may be used to provide a feel and a resistance to the rotation of the adapter plate 110. This may be useful in keeping the battery contacts in the desired orientation while the device is moved. Protrusions 129 or similar elements may also be used to releasably lock the plate body 120 in position unless released by the user.

Figure 1:
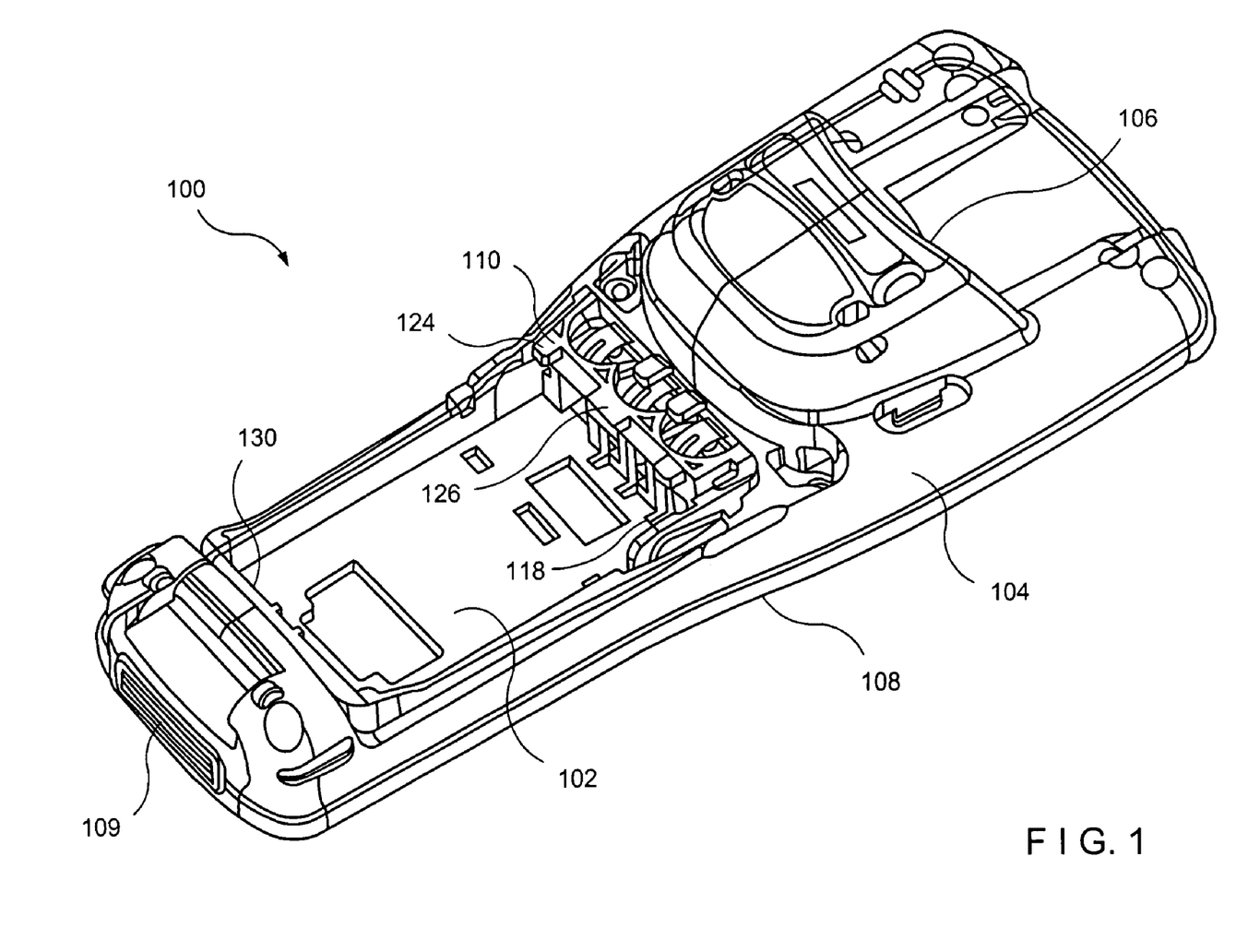
FIG. 1 is a perspective wire drawing showing an exemplary embodiment of a portable device with a contacts adapter plate in a first configuration, according to the invention.
Figure 2:
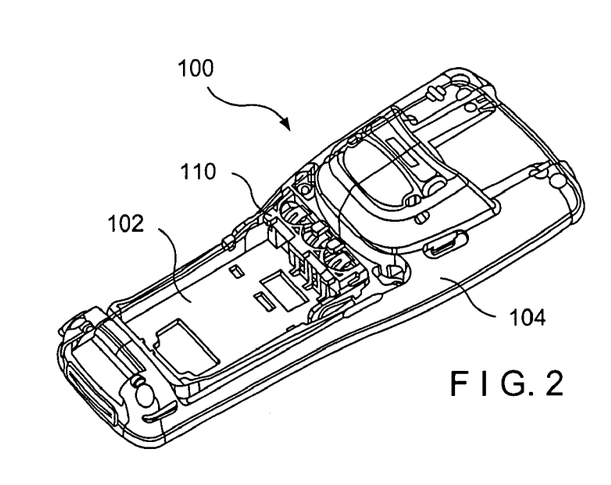
FIG. 2 is a perspective view of the portable device shown in FIG. 1.

FIG. 1 shows the exemplary electronic device 100 with the adapter plate 110 rotated to a second, lowered operative configuration. In this orientation, the battery contacts 118 are presented towards the battery compartment 102, ready to contact the terminals of a prismatic shape battery. Similarly, the spacer elements 124, 126 are also positioned towards the battery compartment 102. In many applications, only two battery contacts 118 are used, to match the two polarities of the battery terminals. However, if the prismatic shape battery has more terminals, additional battery contacts 118 may be provided. In this embodiment, the second battery contacts 130 which may be present in the portable device 100 remain unused, since prismatic shape batteries typically only have terminals on one side, facing the adapter plate 110.

Figure 3:
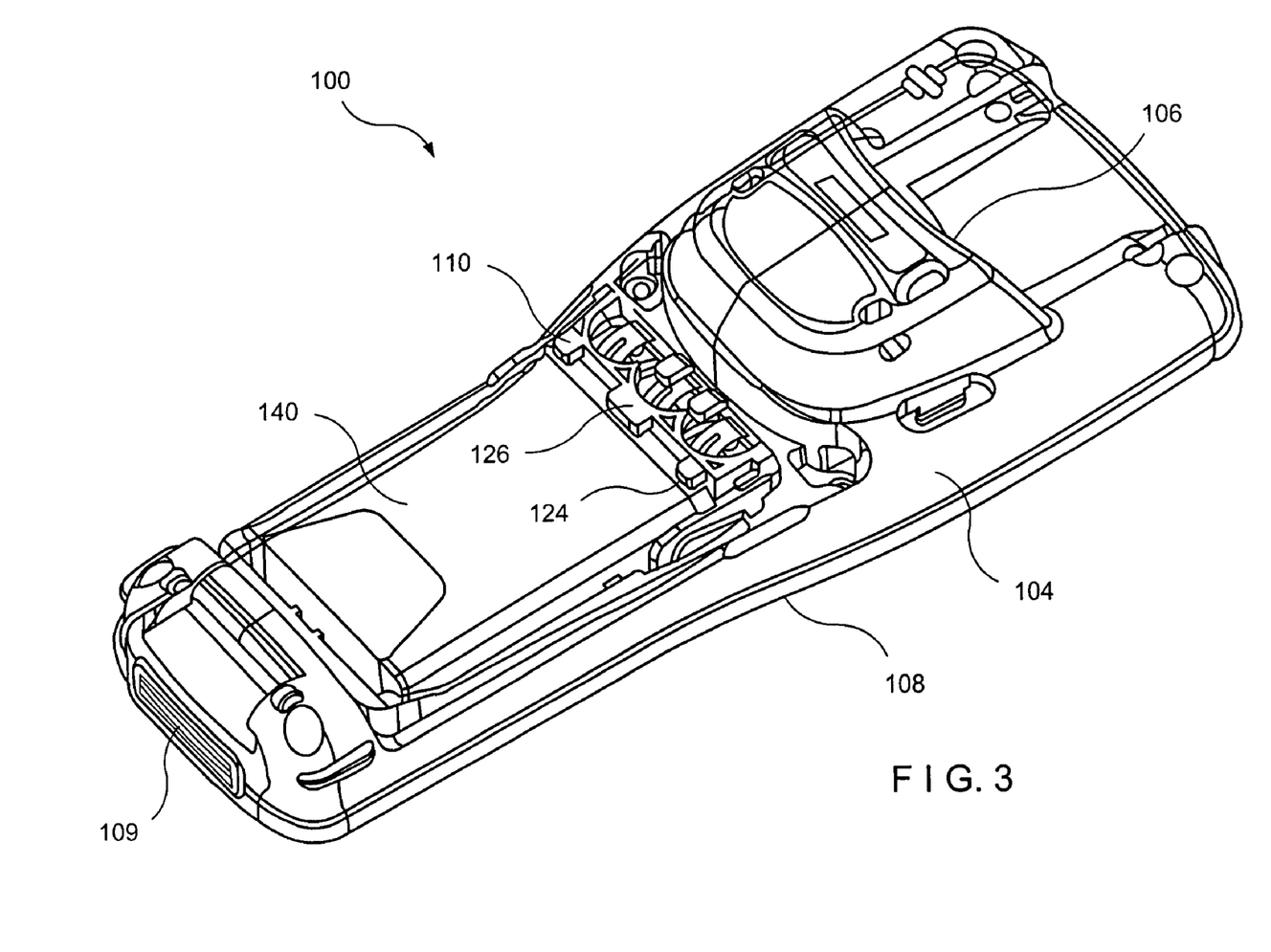
FIG. 3 is a perspective wire drawing showing the exemplary portable device with the contacts adapter plate in the first configuration and containing a prismatic shape battery.
Figure 4:
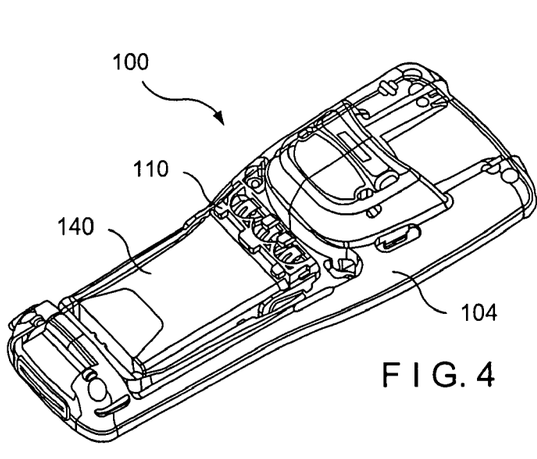
FIG. 4 is a perspective view of the portable device shown in FIG. 3.

The exemplary electronic device 100 is shown in FIGS. 3 and 4 with a prismatic shape battery 140 placed in the battery compartment 102. The prismatic shape battery 140 may be, for example, a Li-ion battery. As shown in the drawings, the spacers 124, 126 may be used to immobilize the prismatic shape battery 140 within the device, so as to prevent excessive movement within the battery compartment 102 when the portable device 100 is moved by the user. Battery contacts 118 may be in electrical contact with one or more terminals such as terminal 122, which forms a connection between the adapter plate 110 and the electrical alimentation system of the portable electronic device 100. Terminal 122 may comprise two separate conductors, which connect to the positive and negative terminals of the prismatic shape battery 140.

According to the exemplary embodiment of the present invention described above, a portable electronic device 100, which may be a hand held scanner, may be powered by either a prismatic shape battery or by three cylindrical shape batteries. An adapter plate 110 which is unitary with the battery compartment 102 may be rotated between a raised and a lowered position by the user. In the raised position, the adapter plate 110 presents contacts 118 and spacers 124, 126 which are designed to function in conjunction with a prismatic shape battery. In the lowered position, contacts 116 and spacers 114, 115 are presented, which are designed to function with the cylindrical shape batteries. The adapter plate 110 is built in within the body 104 of the device 110, and is sufficiently small to not interfere with the other functions and operation of the device.

The present invention has been described with reference to embodiments that include a battery compartment and associated battery contacts which are specialized to accommodate cylindrical shape batteries and prismatic shape batteries. Different types of batteries may be accommodated by embodiments of the present invention in addition to the Li ion and the three cylindrical shape batteries described above. Accordingly, various modifications and changes may be made to the embodiments without departing from the broadest spirit and scope of the present invention as set forth in the claims that follow. In particular, other types of batteries may be used to power the electronic device 100. The specification and drawings are accordingly to be regarded in an illustrative rather than in a restrictive sense.

What is claimed is:

1. A portable electronic device, comprising:
   a body accommodating electrical components of the device, the body defining a battery chamber; and
   a battery receiving element movably mounted within the battery chamber, the battery receiving element including a first set of electrical contacts configured for a first battery type and a second electrical contact configured for a second battery type, the battery receiving element being movable between a first position in which only the first set of electrical contacts is exposed in the battery chamber and a second position in which only the second electrical contact is exposed in the battery chamber.

2. The device according to claim 1, wherein the receiving element further comprises a spacer element configured so that, when the battery receiving element is in the first position, the spacer element separates from one another a plurality of first batteries received within the battery chamber and aligns the first batteries with corresponding ones of the first set of electrical contacts.

3. The device according to claim 1, wherein pivots of the receiving element cooperate with slots of the body to move the receiving element between the first and second positions.

4. The device according to claim 1, wherein the first battery type includes a cylindrical shape battery and the second battery type includes a prismatic shape battery.

5. The device according to claim 1, wherein at least one of the first and second battery types includes a rechargeable battery.

6. A portable barcode scanner, comprising:
optical scanning elements adapted to scan an indicia;
a body accommodating the scanning elements, the body defining a battery chamber; and
a battery receiving element movably mounted within the battery chamber, the battery receiving element including a first set of electrical contacts configured for a first battery type and a second electrical contact configured for a second battery type, the battery receiving element being movable between a first position in which only the first set of electrical contacts is exposed in the battery chamber and a second position in which only the second electrical contact is exposed in the battery chamber.

7. The scanner according to claim 6, wherein the optical scanning elements include a light source emitting light and an optical receiver collecting light.

8. The scanner according to claim 6, further comprising:
an electronic processor accommodated within the body.

9. The scanner according to claim 6, further comprising:
a wireless data connection.

10. The scanner according to claim 6, wherein the receiving element further comprises a spacer element configured so that, when the battery receiving element is in the first position, the spacer element separates from one another a plurality of first batteries received within the battery chamber and aligns the first batteries with corresponding ones of the first set of electrical contacts.

11. The scanner according to claim 6, wherein pivots of the receiving element cooperate with slots of the body to move the receiving element between the first and second positions.

12. The scanner according to claim 6, wherein the first battery type includes a cylindrical shape battery and the second battery type includes a prismatic shape battery.

13. The scanner according to claim 6, wherein at least one of the first and second battery types includes a rechargeable battery.

14. A battery receiving assembly of a portable device, comprising:
a first set of electrical contacts configured for a first battery type; and
a second electrical contact configured for a second battery type,
wherein the assembly movably mounted within a battery chamber of the device, the assembly being movable between a first position in which only the first set of electrical contacts is exposed in the battery chamber and a second position in which only the second electrical contact is exposed in the battery chamber.

15. The assembly according to claim 14, further comprising:
a spacer element configured so that, when the assembly is in the first position, the spacer element separates from one another a plurality of first batteries received within the battery chamber and aligns the first batteries with corresponding ones of the first set of electrical contacts.

16. The assembly according to claim 14, further comprising:
pivots cooperating with slots of the device to move the assembly between the first and second positions.

17. The assembly according to claim 14, wherein the first battery type includes a cylindrical shape battery and the second battery type includes a prismatic shape battery.

18. The assembly according to claim 14, wherein at least one of the first and second battery types includes a rechargeable battery.

* * * * *